Patented Apr. 18, 1950

2,504,807

UNITED STATES PATENT OFFICE 2,504,807

PREPARATION OF ISOPROPYL AMINES

Eugene D. Crittenden, Petersburg, Va., assignor to Allied Chemical & Dye Corporation, a corporation of New York No Drawing. Application April 15, 1947, Serial No. 741,697

13 Claims. (Cl. 260—585)

This invention relates to the manufacture of isopropyl amines, and is directed more particularly to processes for the preparation of amine mixtures containing diisopropyl amine and predominating quantities of monoisopropyl amine.

Although it is known that amines may be made by reaction of ammonia with alkyl halides, the reaction of ammonia with alkyl sulfates to form amines has not been investigated to any great extent. The prior art suggests the preparation of methyl amine from dimethyl sulfate and ammonia, but shows low yields which are manifestly attributable to the reaction of only one of the alkyl groups of the dialkyl sulfate with ammonia. Yields of this nature are too low to warrant economical commercial development.

This invention aims to provide processes which result in good yields of isopropyl amines from isopropyl sulfate starting materials. Another object of the present improvements is to afford processes by the practice of which it is possible to effect conversion of substantially both alkyl groups of diisopropyl sulfate to isopropyl amines. A further object is provision of processes for obtaining both mono and diisopropyl amines from readily available isopropyl sulfate materials.

In accordance with the invention I have found that if ammonia is reacted with a substantially anhydrous isopropyl sulfate under certain herein described temperatures, pressures and other conditions, good yields of isopropyl amines may be obtained. Further, I find that if ammonia is reacted with diisopropyl sulfate under these certain temperature, pressure and other conditions, substantially both alkyl groups of the diisopropyl sulfate are converted to isopropyl amines, this latter observation being the apparent basis for obtaining isopropyl amine yields substantially in excess of those indicated as theoretically possible by the prior art.

Briefly, the process of the invention comprises effecting reaction of suitably chosen proportions of an isopropyl sulfate and ammonia by subjecting these materials to the action of elevated temperatures and pressures in an autoclave designed to accommodate the herein indicated temperatures and pressures of reaction.

The isopropyl sulfate starting materials used in accordance with the practice of the invention comprise diisopropyl sulfate, $(C_3H_7)_2SO_4$, isopropyl hydrogen sulfate or monoisopropyl sulfate, $C_3H_7HSO_4$, or mixtures thereof. Substantially pure diisopropyl sulfate may be utilized, or a starting material containing diisopropyl sulfate and preferably a minor proportion of monoisopropyl sulfate may be employed. A readily obtainable and preferred sulfate starting material is diisopropyl sulfate liquor formed by gassing sulfuric acid with propylene.

A diisopropyl sulfate liquor may be prepared by gassing 95-100% strength sulfuric acid with sufficient propylene to react with substantially all the acid to thereby form predominantly isopropyl sulfate. For example, gassing of the sulfuric acid with propylene is preferably effected at temperatures in the range of zero to minus 10° C., and when utilizing 95-100% strength sulfuric acid about 2 mols of propylene are needed for each mol of $H_2SO_4$. The reaction probably proceeds as follows:

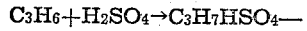
isopropyl hydrogen sulfate
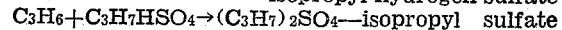

Use of an insufficient quantity of propylene results in formation of some monoisopropyl sulfate, and although in accordance with the present invention it appears certain that the one alkyl group of this material reacts with ammonia to form the sought-for isopropyl amines, the overall amine yield will be higher if all of the ester is in the form of diisopropyl sulfate. Hence, in the gassing of the sulfuric acid it is preferred to employ such a sufficient excess of propylene that the monoisopropyl sulfate content of the diisopropyl sulfate liquor is minimized. The expression "diisopropyl sulfate liquor" as utilized in the appended claims is intended to designate a liquor which is or is comparable with the propylene-sulfuric acid reaction liquor described above and which may contain appreciable amounts of monoisopropyl sulfate and smaller amounts of free sulfuric acid and other impurities or inerts such as propylene polymers, isopropyl alcohol, diisopropyl ether and propane.

It is to be noted that the liquor made by propylene gassing of strong sulfuric acid is not a liquor which is merely free propylene absorbed in sulfuric acid as an absorption medium. Such liquor contains essentially diisopropyl sulfate and variable small amounts of isopropyl hydrogen sulfate and possibly free unreacted sulfuric acid. Thus, subsequent reaction of this liquor with ammonia is not a reaction between an olefin and ammonia, but rather between an ester and ammonia.

If in place of the above described diisopropyl sulfate liquor it is desired to use in the practice of the invention substantially pure diisopropyl sulfate, the latter may be prepared as follows.

The diisopropyl sulfate liquor obtained by the above described gassing of sulfuric acid with propylene may be washed with ice water followed preferably by a final wash with aqueous ammonia solution to aid in removal of isopropyl hydrogen sulfate. After substantially complete removal of the isopropyl hydrogen sulfate and free sulfuric acid, the diisopropyl sulfate liquor may be dried with any suitable drying agent, e. g. anhydrous sodium sulfate, by allowing the mixture to stand for several hours. After separation from the sodium sulfate, the resulting dried diisopropyl sulfate liquor may then be distilled at reduced pressure of about 3 mm. of mercury, and there may be obtained a colorless condensate having a boiling point of 79° C. at 3.5 mm. of mercury.

As subsequently more fully discussed, the ammonia-isopropyl sulfate reaction of the process of the invention is carried out under substantially anhydrous conditions. To facilitate the maintenance of such conditions, particularly when using the above noted sulfuric acid-propylene reaction liquor as sulfate starting material, the sulfuric acid used in the propylene gassing operation should have an H₂SO₄ strength of not less than 95%, and to obtain best overall results with respect to final products, the propylene is preferably reacted with technical 100% sulfuric acid which, for all practical purposes, may be considered as anhydrous.

The isopropyl sulfate starting material and ammonia are run into a suitable autoclave. The ammonia employed is preferably commercial "anhydrous ammonia" which, for practical purposes, may be considered as an anhydrous material. With respect to the amount of ammonia employed, I find that about two mols of ammonia are theoretically required for each mol of propylene in the diisopropyl sulfate content of the particular sulfate fed to the autoclave. However, since in the preferred embodiment isopropyl hydrogen sulfate is also present to some extent in the autoclave charge, I have found that to obtain maximum conversion to isopropyl amine, theoretically 2 to 3 mols of ammonia are needed for each mol of the propylene content in the isopropyl sulfate liquor employed, depending on the ratio of diisopropyl sulfate to isopropyl hydrogen sulfate present. To obtain best yields of isopropyl amine, in practice 2 to 5, and preferably 3 to 5, mols of ammonia are usually employed per mol of propylene in the isopropyl sulfate liquor. No better results are obtained by employing more than 5 mols of ammonia per mol of propylene, and the yields of isopropyl amine actually tend to decrease under these conditions.

Reaction of ammonia with the isopropyl sulfate starting material is effected at elevated temperature and pressure. Minimum temperature should be not less than 100° C. A satisfactory maximum operating temperature is 300° C., and while if desired higher temperatures may be employed, no particular advantages are obtained. Generally, preferred temperatures lie in the range of 150–250° C., and the best yields have been obtained when operating substantially within the narrower range of 200–250° C. Pressure is ordinarily maintained at not less than 750 lbs. gauge, and while maximum operating gauge pressure may be as high as 3500 lbs., in usual operation, pressure does not generally exceed about 2500 lbs. Pressures above 3500 lbs. gauge may be employed but without affording any particular advantages. I find that best yields and the most convenient mode of operation result when reaction is carried out under the autogenous pressure developed in the autoclave by the particular temperatures employed. Autoclaves made of stainless steel or chrome-vanadium steel have been found to be satisfactory.

Another important operating factor is that the ammonia-isopropyl sulfate reaction should be carried out under substantially anhydrous conditions. In the specification and claims, the expression "substantially anhydrous conditions" is intended to denote a condition in the ammonia-isopropyl sulfate reaction mass such that the reaction mass at no time during the course of the reaction contains more water than would be present if the total isopropyl sulfate in the autoclave were charged to the autoclave in the form of a propylene-sulfuric acid reaction liquor made by propylene gassing of sulfuric acid of H₂SO₄ strength not less than 95%. Hence, having regard for the foregoing, the ammonia and/or the isopropyl sulfate introduced into the autoclave need not be totally anhydrous, although as previously indicated both the ammonia and the isopropyl sulfate are preferably anhydrous.

When proceeding in accordance with the foregoing operating conditions, the reactions taking place in the autoclave appear to be represented by the following:

$$(C_3H_7)_2SO_4 + 2NH_3 = C_3H_7NH_2 + C_3H_7NH_4SO_4$$
$$(C_3H_7)HSO_4 + NH_3 = C_3H_7NH_4SO_4$$
$$C_3H_7NH_4SO_4 + 2NH_3 = C_3H_7NH_2 + (NH_4)_2SO_4$$

The overall reaction with respect to production of the predominantly present monoisopropyl amine appears to proceed principally in accordance with the following:

$$4NH_3 + (C_3H_7)_2SO_4 \rightarrow 2C_3H_7NH_2 + (NH_4)_2SO_4$$

In addition to the formation of predominantly isopropyl amine, diisopropyl amine is formed in considerably smaller amounts, and tri-isopropyl amine as well as tetraisopropyl ammonium sulfate may be produced in much smaller quantities than either the primary or secondary amines. Other compounds such as isopropyl ammonium sulfate may also be found in the reaction products to some small degree. The time required for the isopropyl amine conversion reaction to take place to completion varies with the pressure and temperature employed. Several hours are normally required, usually up to about 5 hours. Prolonging the period of ammoniation beyond this time is of no appreciable value. Particularly when conducting operations under the described preferred conditions, total isopropyl amine yields in excess of 50 mol per cent, based on the propylene content of the isopropyl sulfate starting material, may be obtained.

The isopropyl amines may be recovered from the reaction mixture in any suitable manner, e. g. in the following way. The autoclave may be cooled, preferably below the boiling point of ammonia, e. g. from minus 40° C. to minus 70° C., in order to reduce the pressure in the autoclave and prevent rapid evolution of ammonia on opening, and the reaction products may be diluted by slow addition with water to dissolve the amines and the salts while the reaction mass is at the indicated sub-zero temperature. The resulting aqueous solution may be warmed to about 0° C., poured from the autoclave, neutralized with an alkali such as sodium hydroxide, preferably of about 30% strength, and subjected to distillation at atmospheric pressure until the liquid in the still pot reaches about 100° C. The amines and the ammonia distilled off may be absorbed in an acid solution such as hydrochloric acid, or collected in a trap suitably packed with dry ice and maintained at a temperature of about −60° to −70° C. to effect condensation of the amines. If the volatilized amines are absorbed in the acid solution, thereafter the solution may be evaporated to dryness, and the solid amine and ammonium salts obtained as residue may be extracted with a solvent such as anhydrous n-propanol to separate the amine from the ammonium salts. The extract containing only the amine salts may then be evaporated to dryness, leaving the solid amine salts as residue which may then be analyzed for carbon to determine the conversion of propylene to amines. The combined were collected in condensers cooled with ice water. 8.5 parts of isopropyl amine and 1.1 parts of a liquid having a boiling range of 75°–85° C. and taken as diisopropyl amine were recovered. A yield of 72.0 mol per cent conversion to monoisopropyl amine and 11.4 mol per cent conversion to diisopropyl amine based on propylene, representing a total conversion of propylene to amine of 83.4%, was thus obtained as summarized in run No. 1 of the appended table. The monoisopropyl amine and the diisopropyl amine were identified by their boiling points of about 34° C. and 84° C. respectively. However, these amines may be further identified by refractive index or by melting point of the purified hydrochloride derivatives.

| Run No. | Time, Hours | Temperature, °C. | Pressure, lbs. gauge | Alkylating Agent | | Mols C₃H₆ Per Mol H₂SO₄ | Mols NH₃ per mol propylene in reaction liquor | Product Yield based on C₃H₆ Content of C₃H₆—H₂SO₄ Reaction Liquor;—Recovered Amine | | |
|---|---|---|---|---|---|---|---|---|---|---|
| | | | | Agent Type | H₂SO₄ Used, Per Cent | | | Primary, Mol per cent | Secondary, Mol per cent | Total |
| 1 | 4 | 200 | Autogenous 1000 lbs. | C₃H₆—H₂SO₄ Reaction Liquor | 100 | 1.77 | 3.9 | C₃H₇NH₂ 72.0 | (C₃H₇)₂NH 11.4 | 83.4 |
| 2 | 4 | 250 | Autogenous 1200 lbs. | ...do... | 100 | 1.77 | 3.9 | 53.0 | 13.6 | 66.6 |
| 3 | 4 | 200 | Autogenous 1700 lbs. | ...do... | 100 | 1.86 | 12.8 | 52.0 | 3.8 | 55.8 |
| 4 | 1 | 200 | Autogenous 1200 lbs. | ...do... | 100.75 | 1.87 | 6.3 | 39.9 | 20.6 | 60.5 | amine salts may be mixed with an alkali e. g. sodium hydroxide, and the resulting mass may be distilled at atmospheric pressure in a suitable column, e. g. one having about 15 theoretical plates and a reflux ratio of about 1, to separate the various amines, which are collected in a cooled receiver at about 0° C., the principal amine obtained, monoisopropyl amine, distilling over at about 32–34° C. with the diisopropyl amine coming over at about 84° C.

If the amines evolved by the first mentioned distillation were collected in an ice trap, such amines may be separated by fractional distillation at atmospheric pressure without undergoing the additional treatment noted above.

Following is an example of practice of the invention. A propylene-sulfuric acid reaction liquor was made by propylene gasing of 100% sulfuric acid in proportions of about 1.77 mols of propylene per mol of 100% H₂SO₄. About 19.6 parts (by weight) of this propylene-sulfuric acid reaction liquor were placed in a chrome-vanadium steel autoclave. Approximately 3.9 mols of anhydrous ammonia per mol of propylene in the propylene-sulfuric acid reaction liquor were introduced into the autoclave, and the contents were brought to a temperature of about 200° C. by heating the autoclave in an oil bath. The reaction proceeded under the developed autogenous pressure which was about 1000 lbs. gauge. At the end of about 4 hours, heating was discontinued, the reaction mixture was cooled to about minus 70° C., the autoclave opened and about 80 parts of water were slowly added with swirling to the mixture at this temperature to dissolve the amines and the salts. The diluted mass was warmed to about 0° C. The resulting aqueous solution was poured from the autoclave, neutralized by the addition of approximately 100 parts of a 30% solution of sodium hydroxide, and distilled at atmospheric pressure using a small column. Ammonia was first removed following which isopropyl amine distilled over at about 34° C. and diisopropyl amine at about 84° C. The amines Runs 2, 3 and 4 were carried out in approximately the same manner as run 1. A propylene-sulfuric acid reaction liquor was prepared as in run 1, placed in an autoclave, and ammonia introduced to initiate reaction which proceeded at autogenous pressure. The amines formed in runs 2 and 3 were recovered by the same procedure as for run 1. In run 4 the amines were recovered by absorption in hydrochloric acid as previously described.

It is noted that in runs 3 and 4 the yields were 55.8 and 60.5 total mol per cent of amines respectively as compared to 83.4 obtained in run 1 at about the same reaction temperature, i. e. 200° C. While taking into account any effect on yields as a result of the different operating pressures employed in runs 1, 3 and 4, it appears that the use of such large quantities of ammonia as 12.8 and 6.3 mols per mol of propylene in the absorption liquor in runs 3 and 4 respectively indicate no particular advantage over the use of a smaller amount of ammonia on the order of about 4 mols per mol of propylene in the absorption liquor noted in run 1. However, the short reaction time of 1 hour for run 4 indicates the effectiveness of my process even for short reaction periods.

I claim:

1. The process comprising reacting, under substantially anhydrous conditions, ammonia and an isopropyl sulfate at temperature not less than 100° C. and at pressure not less than 750 lbs. gauge.

2. The process comprising reacting, under substantially anhydrous conditions, ammonia and an isopropyl sulfate at temperature in the range of 100–300° C. and at pressure in the range of 750–2500 lbs. gauge.

3. The process comprising reacting, under substantially anhydrous conditions, ammonia and diisopropyl sulfate at temperature not less than 100° C. and at pressure not less than 750 lbs. gauge.

4. The process comprising reacting, under substantially anhydrous conditions, ammonia and a diisopropyl sulfate liquor at temperature not less than 100° C. and at pressure not less than 750 lbs. gauge.

5. The process comprising reacting, under substantially anhydrous conditions, ammonia and a diisopropyl sulfate liquor at temperature in the range of 100–300° C. and at pressure in the range of 750–2500 lbs. gauge, and recovering isopropyl amine from the reaction products.

6. The process comprising reacting anhydrous ammonia and an anhydrous diisopropyl sulfate liquor at temperature not less than 100° C. and at pressure not less than 750 lbs. gauge.

7. The process comprising reacting, under substantially anhydrous conditions, ammonia and an isopropyl sulfate at temperature not less than 100° C. and at autogenous pressure.

8. The process of producing isopropyl amine which comprises reacting, under substantially anhydrous conditions, ammonia and a propylene-sulfuric acid reaction liquor at a temperature in the range of 100–300° C. and at autogenous pressure, and recovering the isopropyl amine formed from the reaction products.

9. The process of producing isopropyl amine which comprises reacting, under substantially anhydrous conditions, ammonia and a diisopropyl sulfate liquor at a temperature in the range of 150–250° C. and at autogenous pressure, and recovering the isopropyl amine formed from the reaction products.

10. The process of producing isopropyl amine which comprises reacting anhydrous ammonia with a propylene-sulfuric acid reaction liquor, formed by treating 95–100% sulfuric acid with sufficient propylene to react with substantially all of said acid to form predominantly diisopropyl sulfate, at a temperature in the range of 150–250° C. and at autogenous pressure, and recovering the isopropyl amine formed from the reaction products.

11. The process of producing isopropyl amine which comprises reacting anhydrous ammonia with a propylene-sulfuric acid reaction liquor, formed by treating 95–100% sulfuric acid with propylene in a ratio of 2 mols of propylene per mol of $H_2SO_4$ whereby diisopropyl sulfate is predominantly produced, at a temperature in the range of 150–250° C., and at pressure in the range of 750–2500 lbs. gauge, from 2 to 5 mols of anhydrous ammonia being employed per mol of propylene in said reaction liquor, and recovering the isopropyl amine formed from the reaction product.

12. The process of producing isopropyl amines which comprises introducing sufficient propylene into 95–100% sulfuric acid to react with substantially all of said acid to form a propylene-sulfuric acid reaction liquor containing predominantly diisopropyl sulfate, reacting 3 to 5 mols of anhydrous ammonia per mol of propylene in said reaction liquor with said liquor at a temperature in the range of 150–250° C. and at autogenous pressure, and recovering isopropyl amine and diisopropyl amine from the reaction products.

13. The process of producing isopropyl amines which comprises introducing about 2 mols of propylene into each mol of approximately 100% sulfuric acid to react with substantially all of said acid to form a reaction liquor containing predominantly diisopropyl sulfate, reacting 3 to 5 mols of anhydrous ammonia per mol of propylene in said reaction liquor with said liquor at a temperature in the range of 200–250° C. and at autogenous pressure for a period up to about 5 hours, and recovering isopropyl amine and diisopropyl amine from the reaction products.

EUGENE D. CRITTENDEN.

REFERENCES CITED

The following references are of record in the file of this patent:

UNITED STATES PATENTS

| Number | Name | Date |
|---|---|---|
| 2,364,178 | Wilson | Dec. 5, 1944 |

OTHER REFERENCES

Degering, "Org. Nitrogen Compounds" (Univ. Lithoprinters, Ypsilanti, Mich., 1945), page 202, para. 598.